United States Patent
Le-Romancer et al.

(10) Patent No.: US 11,708,907 B2
(45) Date of Patent: Jul. 25, 2023

(54) METHOD AND DEVICE FOR CHECKING THE ENGAGEMENT OF A PARKING BRAKE FINGER

(71) Applicant: Nissan Motor Co., Ltd., Yokohama (JP)

(72) Inventors: Julien Le-Romancer, Montigny le Bretonneux (FR); Jeremy Mourgue, Longjumeau (FR)

(73) Assignee: Nissan Motor Co., Ltd., Yokohama (JP)

(*) Notice: Subject to any disclaimer, the term of this patent is extended or adjusted under 35 U.S.C. 154(b) by 48 days.

(21) Appl. No.: 17/279,189

(22) PCT Filed: Nov. 7, 2019

(86) PCT No.: PCT/EP2019/080609
§ 371 (c)(1),
(2) Date: Mar. 24, 2021

(87) PCT Pub. No.: WO2020/094813
PCT Pub. Date: May 14, 2020

(65) Prior Publication Data
US 2022/0003314 A1    Jan. 6, 2022

(30) Foreign Application Priority Data

Nov. 8, 2018 (FR) ...................................... 1871408

(51) Int. Cl.
  *F16H 63/34*    (2006.01)
  *F16H 63/48*    (2006.01)
  *F16H 59/68*    (2006.01)

(52) U.S. Cl.
  CPC ....... *F16H 63/483* (2013.01); *F16H 63/3433* (2013.01); *F16H 63/3466* (2013.01); *F16H 59/68* (2013.01)

(58) Field of Classification Search
CPC .... F16H 63/48; F16H 63/483; F16H 63/3433; F16H 63/3425; F16H 63/3444; F16H 59/68; B60W 10/182
See application file for complete search history.

(56) References Cited

U.S. PATENT DOCUMENTS

2015/0025750 A1    1/2015  Weslati et al.
2016/0053885 A1*   2/2016  Noto ................... F16H 61/0202
                                                  74/473.12
2016/0298761 A1*  10/2016  Noto ................... F16H 63/3425

FOREIGN PATENT DOCUMENTS

EP    3061997 A1      8/2016
FR    2956180 A1      8/2011
JP    2009162346 A *  7/2009

* cited by examiner

*Primary Examiner* — Lori Wu
(74) *Attorney, Agent, or Firm* — Global IP Counselors, LLP

(57) ABSTRACT

A method is provided for checking engagement and disengagement of a parking brake finger, which selectively blocks or blocks a shaft of the transmission. A motor-driven rotary selection plate is selectively controlled to butt against the transmission casing at the two ends of its travel, and is immobilized therebetween in a first functional engagement position and in a second functional disengagement position that correspond to the Park and non Park positions of the parking brake finger when the drive motor of the plate stops exerting torque thereon. The angular movements of the plate between its abutment positions are measured and incremented using a computer to determine whether the engagement position and disengagement position of the plate that is reached every time the drive motor is stopped corresponds to a command instruction given to the motor.

10 Claims, 2 Drawing Sheets

METHOD AND DEVICE FOR CHECKING THE ENGAGEMENT OF A PARKING BRAKE FINGER

CROSS-REFERENCE TO RELATED APPLICATIONS

This application is a U.S. national stage application of International Application No. PCT/EP2019/080609, filed on Nov. 7, 2019.

BACKGROUND

Technical Field

The present invention concerns the control of the parking brake finger for any automatic, automated or semi-automatic gearbox.

Background Information

Immobilization of the vehicle by its parking brake is generally ensured by the engagement of a parking brake finger between the teeth of a toothed wheel that is integral with a transmission shaft of the vehicle, for example a gearbox or differential shaft.

Publication FR 2 956 180, to which reference may be made, describes a parking brake mechanism comprising an actuating lever external to the gearbox, which receives via a ball joint the end of a control cable that is itself connected to a control selector for the driver, said mechanism having several functional positions of the transmission, for example a Park position, a Reverse position, a Neutral position, and a Drive position. The external lever is integral with an internal control shaft on which a control plate is mounted that acts on the parking brake finger.

The control plate has a functional notched selection zone comprising alternate recesses and protrusions. Each recess corresponds to selection of one of the functional positions, including at least one engagement position and one disengagement position of the parking brake finger. The plate cooperates with detent means which are fixed to the gearbox casing and able to elastically retain the plate in each of these positions.

At present, the position of the parking brake finger is detected by a position sensor or TRS (Transmission Range Sensor) associated with a parking brake control element. The reduction in volume available in the gearbox for installing a parking brake position sensor leads to the need for other checking means.

SUMMARY

One object presented in this disclosure is to provide a method for checking the engagement and disengagement of a parking brake finger which is responsible for blocking or unblocking a shaft of the transmission, under the control of a motorized rotary selection plate which abuts against the transmission casing at both ends of its travel and stops in-between in a first functional engagement position (Park) or in a second functional disengagement position (non-Park) of the parking brake finger when its motor ceases to exert torque thereon. A further object of the invention is a device for implementing the method.

The present invention aims to perform the internal function of checking the engagement of the motorized parking brake without using a physical position sensor.

To this end, it proposes that the angular movements of the plate between its abutment positions are measured and incremented in a transmission computer unit, in order to determine whether the Park or non-Park functional position of the plate, which is reached after each stoppage of the drive motor, corresponds to the control instruction given to the plate drive motor by the transmission.

According to another characteristic of the invention, a learning phase is performed on first use of the vehicle, comprising:
actuating the drive motor in a first direction until the plate comes to rest against the casing, in order to identify the initial position of the parking brake from the amplitude of movement performed between this and its abutment position, then
actuating the drive motor in the reverse direction in order to return the plate to its initial position,
memorizing this position in the computer unit.

The corresponding control device comprises:
a rotary plate actuated by a drive motor, mechanically connected to a parking brake finger so as to move the latter between an engagement position between two teeth of a wheel of the parking brake, and a disengagement position at a distance therefrom,
a mechanical means for holding the plate in its functional positions of engagement and disengagement of the parking brake, and
a computer unit able to identify the positions of the plate and increment its angular movements.

BRIEF DESCRIPTION OF THE DRAWINGS

The present invention will be better understood from reading the following description of a non-limitative embodiment thereof with reference to the attached drawings.

DETAILED DESCRIPTION OF EMBODIMENTS

Figure 1:
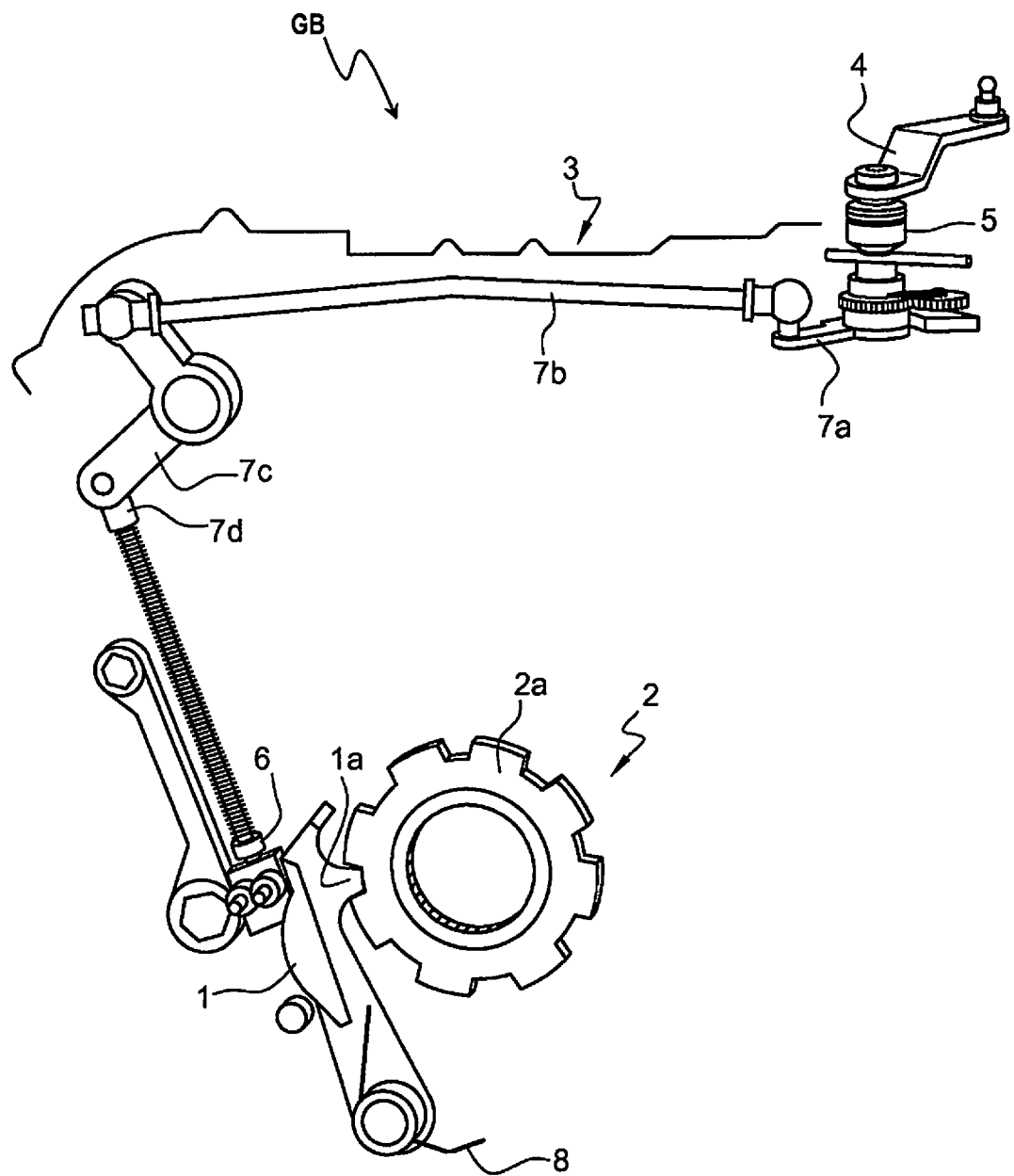
FIG. 1 is an overall view of an engagement mechanism of the parking brake.

The parking brake engagement mechanism in FIG. 1 is arranged partly inside the gearbox casing 3. It comprises an engagement tumbler 1 carrying a finger 1a, which in the diagram is engaged between two teeth 2a of a parking brake wheel 2 that is fixed to a shaft (not shown) of the gearbox GB. The mechanical connection between an external lever 4 and the tumbler 1 comprises a shaft 5 which is rotationally fixed to the lever 4, penetrates inside the casing 3 and actuates a pusher 6 via several return elements 7a to 7d. On the diagram, the mechanism is in the Park position. The tumbler 1 is pushed back against the parking brake wheel by the pusher 6. In the Neutral, Reverse and Drive positions (not shown), the pusher 6 does not exert an action on the tumbler 1. The latter is pushed back away from the parking brake wheel by the return spring 8. The external lever 4 in FIG. 1 is actuated for example by a control cable (not shown) from a selector available to the driver. In the case of an automatic or automated transmission, the control shaft 5 is motorized.

Figure 2:
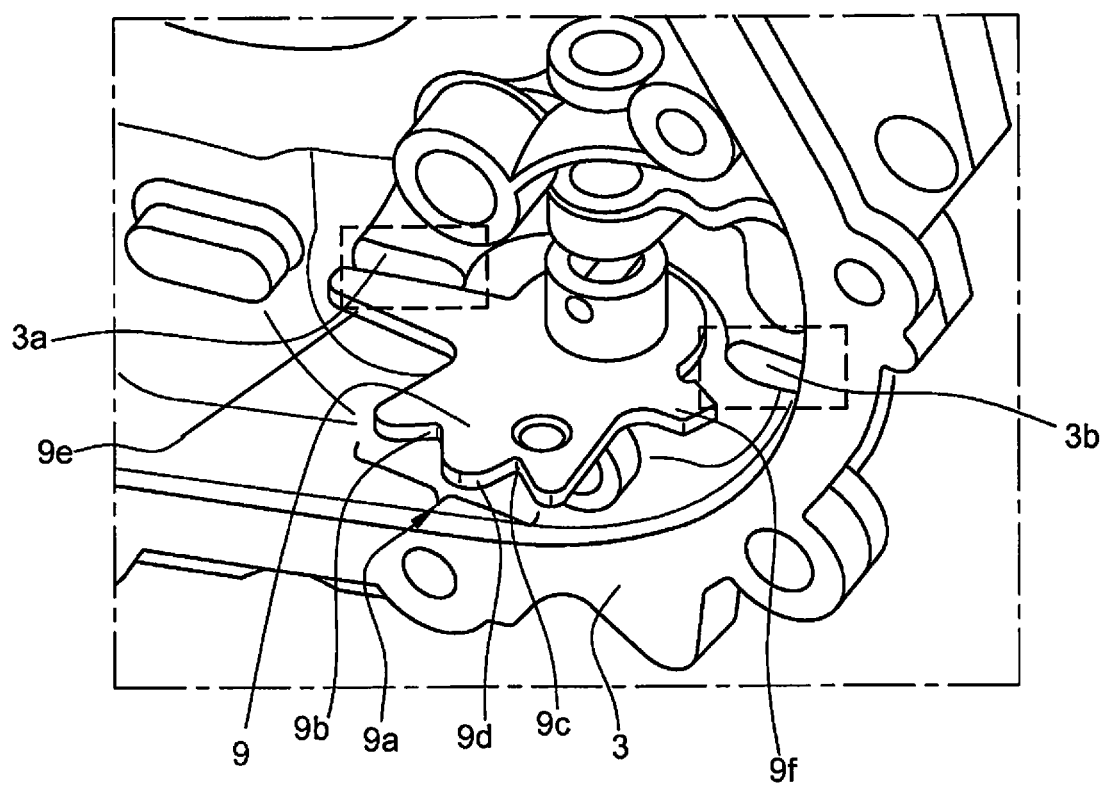
FIG. 2 shows the arrangement of the internal control plate of the mechanism in the gearbox casing.

The control device proposed is illustrated in FIG. 2 and in particular comprises:
a rotary plate 9 actuated by a drive motor and mechanically connected to a parking brake finger 1a (such as that in FIG. 1) so as to move the latter between an engagement position between two teeth 2a of a wheel of the parking brake 2 and a disengagement position at a distance therefrom, a mechanical means (not shown on FIG. 2) for holding the plate 9 in its functional positions of engagement and disengagement of the parking brake, and a computer (not shown) able to identify the positions of the plate 9 and increment its angular movements.

The selection plate 9 turns with the shaft 5. It has a functional zone 9a with two recesses 9b, 9c separated by a boss 9d. The two recesses correspond to the Park and non-Park positions of the parking brake. The plate also comprises two end stops 9e, 9f which abut against support planes 3a, 3b of the transmission casing 3 at the end of travel.

On movement of the rotary plate, the functional zone 9a passes in front of an indexing or mechanical holding system fixed to the casing, such as the detent system (not shown). The recesses 9b, 9c determine the functional selection positions, for example a P (Park) position and a non-Park position (giving access to modes N, D, R etc.). These ensure the indexing of the plate 9 in its positions by cooperating with said holding means. The two side stops 9e, 9f against the casing limit the angular amplitude of the movement.

When the shaft 5 is motorized, the arrival of the plate 9 at its stop is detected for example by observation of electrical over-consumption by its drive motor, which tries to continue to turn the shaft while a mechanical constraint prevents this.

Figure 3:
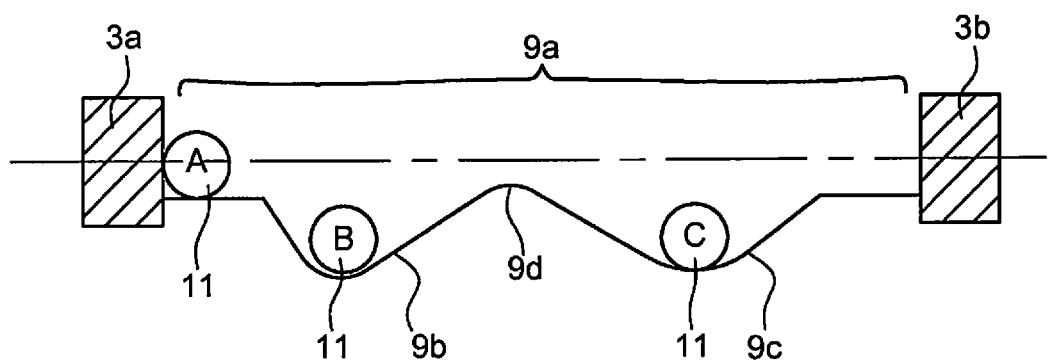
FIG. 3 illustrates the operation of the mechanism at the control plate.

The mechanical means for holding the plate in its Park and non-Park functional positions is for example a detent system, of which only the ball 11 is shown on FIG. 3. This figure illustrates diagrammatically the two support planes 3a, 3b of FIG. 2, the functional zone 9a of the plate 9 with its two recesses 9b, 9c and the boss 9d. The ball appears three times at respective positions A, B, C, against a stop plane 3a of the casing and in the two recesses 9b, 9c.

The plate turns in front of the ball 11 which moves in a substantially radial direction relative to the plate. When the plate 9 turns with the shaft 5, its functional zone passes by. The ball 11 advances into the recesses 9b or 9c of the plate as this passes by. If the torque of the drive motor disappears, the plate is mechanically held in its Park or non-Park position. These two corresponding angular positions of the plate are reference positions for the device for checking the parking brake finger 1a. They are transmitted to the engine or transmission computer (ECU) during parameterization (calibration or configuration). Engagement of the Park position therefore depends on the position of the mechanical component (here the ball 11) which is immobile relative to the recesses 9b, 9c of the plate which pass in front of it on rotational movement of the plate 9.

The method proposed by the invention allows the checking, without a physical position sensor, of the engagement and disengagement of a parking brake finger 1a of a transmission between two teeth of a wheel of the parking brake, under the control of a motorized rotary selection plate which abuts against the transmission casing at both ends of its travel and stops in-between in a first functional engagement position (Park) or in a second functional disengagement position (non-Park) of the parking finger when the motor ceases to exert a torque thereon.

The invention thus allows omission of the position sensor by using a counter or incremental sensor within the actuator.

On first use of the vehicle, a learning phase is performed in order to know the position of the shaft, comprising:

actuating the drive motor in a first direction until the plate comes to rest against the casing, in order to identify the initial position of the parking brake from the amplitude of the movement performed between this and its abutment position, then actuating the drive motor in the reverse direction to return the plate to its initial position, memorizing this position in the computer unit.

During this learning, the plate is moved from its initial position to a lateral stop of the plate 9, which then determines a reference position. As indicated above, the arrival of the plate 9 at the stop may be determined by an over-consumption of current of the drive motor. The shaft is then returned to its initial position by performing the same shaft movement as before but in the opposite direction. The relative position of the shaft relative to the stop is thus known. The position of the recesses (Park and non-Park) was specified for example during configuration or calibration of the computer (ECU).

The incremental sensor is used to quantify the angular movement of the shaft and plate, i.e. its amplitude and direction. From this information, whenever the ball 11 engages in one of the recesses 9b, 9c, the computer is able to determine in which recess the ball is engaged, and hence whether or not the Park position is engaged. Subsequent movements of the plate are incremented so as to be able to identify, on each subsequent stoppage of the drive motor, the Park or non-Park functional position of the plate.

Since the initial position was determined by learning, on each subsequent movement of the shaft 5, its new position is determined relative to the previous position thanks to the incremental sensor. If for example the shaft is at 50° from its stop position against the support plane 3a of the casing next to the position P, before a movement of 10° in the direction of the support plane 3a, its position moves to 40° from this.

In view of the loss of power to the computer each time use of the vehicle ends, the position of the shaft must be memorized regularly so as not to have to be relearned each time the vehicle is started. However, in the case of sudden loss of power, this information may be lost. A new learning must then be performed by turning the shaft in the direction of the request made (Park or non-Park) until the plate butts up against the casing. If for example, during re-initialization, the plate is in the Park position (position B of the ball 11 on the diagram) and the driver requests the Park position, the drive motor is actuated in the learning phase so as to turn the shaft in the Park direction up to the stop plane 3a (movement of the ball 11 to the left in the diagram until it reaches position A). The computer notes the angle travelled between the Park position and the stop 3a on the Park side. From this, it deduces that the shaft was in the Park position, returns the plate of the gearbox to the same position, and memorizes its position.

The present invention has numerous advantages linked to the omission of the usual TRS sensor, including the reliability of the new method and the space saving resulting from this omission.

The invention claimed is:

1. A method for checking the engagement and disengagement of a parking brake finger which is configured to selectively block and unblock movement a shaft of a transmission of a vehicle, the method comprising:

controlling a motorized rotary selection plate which selectively abuts against a transmission casing at both ends of travel and which selectively stops in-between the ends of the travel in a first functional engagement position that corresponds to a Park position of the parking brake finger and in a second functional disengagement position that corresponds to a non-Park position of the parking brake finger when a drive motor of the motorized rotary selection plate ceases to exert torque thereon; and incrementing and measuring angular movements of the motorized rotary selection plate between abutment positions of the motorized rotary selection plate against the transmission casing using a transmission computer to determine whether the first functional engagement position and the second functional position of the motorized rotary selection plate, which is reached after each stoppage of the drive motor, corresponds to a control instruction given to the drive motor by the computer.

2. The method as claimed in claim 1, further comprising performing a learning phase on a first use of the vehicle, the learning phase comprising:

actuating the drive motor in a first direction until the motorized rotary selection plate comes to rest against the transmission casing, in order to identify an initial position of a parking brake from an amplitude of movement performed between the initial position and the abutment position of the motorized rotary selection plate against the transmission casing, then:

actuating the drive motor in a reverse direction in order to return the motorized rotary selection plate to the initial position, and memorizing the initial position in the computer.

3. The method as claimed in claim 2, further comprising incrementing subsequent movements of the motorized rotary selection plate to identify the first functional engagement position and the second functional position on each subsequent stoppage of the drive motor.

4. The method as claimed in claim 2, further comprising storing a last position of the motorized rotary selection plate upon loss of power to the computer so that the last position is available for a next usage of the parking brake.

5. The method as claimed in claim 2, further comprising performing a new learning phase upon sudden loss of power to the computer.

6. The method as claimed in claim 1, further comprising detecting the abutment positions of the motorized rotary selection plate against the transmission casing based on surge voltages in the drive motor.

7. A control device for checking engagement and disengagement of a parking brake finger of a transmission, the device comprising:

a rotary plate actuated by a drive motor and mechanically connected to the parking brake finger so as to move the parking brake finger between an engagement position between two teeth of a wheel of a parking brake, and a disengagement position at a distance therefrom, mechanical means for holding the rotary plate in first and second functional positions corresponding to the engagement and disengagement positions of the parking brake, and a computer configured to identify the first and second functional positions of the rotary plate and increment angular movements of the rotary plate, the first and second functional positions being identified by moving the rotary plate in a direction toward a respective casing abutment.

8. The control device as claimed in claim 7, wherein the plate comprises a functional zone comprising two recesses separated by a boss, corresponding to the engagement and disengagement positions of the parking brake.

9. The control device as claimed in claim 8, wherein the rotary plate has two end stops which abut against a transmission casing at an end of travel.

10. The control device as claimed in claim 7, wherein the mechanical means for holding the rotary plate in the first and second functional positions is a detent system.

* * * * *